(12) United States Patent
Zamora Rodriguez et al.

(10) Patent No.: US 10,495,056 B2
(45) Date of Patent: Dec. 3, 2019

(54) WIND TURBINE BLADE WITH TRAILING EDGE TAB

(71) Applicant: Siemens Gamesa Renewable Energy A/S, Brande (DK)

(72) Inventors: Alonso O. Zamora Rodriguez, Broomfield, CO (US); Edward A. Mayda, Thorton, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 15/747,675

(22) PCT Filed: Sep. 3, 2015

(86) PCT No.: PCT/US2015/048233
§ 371 (c)(1),
(2) Date: Jan. 25, 2018

(87) PCT Pub. No.: WO2017/039666
PCT Pub. Date: Mar. 9, 2017

(65) Prior Publication Data
US 2019/0024627 A1    Jan. 24, 2019

(51) Int. Cl.
*F03D 1/06* (2006.01)
(52) U.S. Cl.
CPC ......... *F03D 1/0641* (2013.01); *F03D 1/0633* (2013.01); *Y02E 10/721* (2013.01)
(58) Field of Classification Search
CPC .................................................. F03D 1/0633
See application file for complete search history.

(56) References Cited

U.S. PATENT DOCUMENTS

| 6,382,921 | B1  | 5/2002  | Selig et al. |
| 6,910,867 | B2* | 6/2005  | Corten ............... F03D 1/0641 416/223 R |
| 7,059,833 | B2* | 6/2006  | Stiesdal ............ F03D 1/0641 416/41 |
| 7,604,461 | B2  | 10/2009 | Bonnet |

(Continued)

FOREIGN PATENT DOCUMENTS

| CN | 102312770 A | 1/2012 |
| CN | 103069157 A | 4/2013 |

(Continued)

OTHER PUBLICATIONS

PCT International Search Report and Written Opinion of International Searching Authority dated May 20, 2016 corresponding to PCT International Application No. PCT/US2015/048233 filed Sep. 3, 2016.

(Continued)

*Primary Examiner* — Kayla Mccaffrey
(74) *Attorney, Agent, or Firm* — Beusse Wolter Sanks & Maire

(57) ABSTRACT

A wind turbine blade (20B-C) with a rounded trailing edge (42A-E) and an elongated tab (44A-J) extending from the pressure side (PS) within the aft 10% of the local chord (C) and generally parallel to the trailing edge to increase lift. The tab may have a height (H) that is greatest on the radially inboard end to maximize lift, and lower on the outboard end to minimize drag. It may have a base with a length of at least 60% of its height.

12 Claims, 5 Drawing Sheets

(56) References Cited

U.S. PATENT DOCUMENTS

| | | | |
|---|---|---|---|
| 8,047,784 B2 * | 11/2011 | Bonnet | F03D 1/0675 |
| | | | 416/1 |
| 8,052,394 B2 * | 11/2011 | Petsche | F03D 1/0641 |
| | | | 29/889.71 |
| 8,083,491 B2 | 12/2011 | Garcillan et al. | |
| 8,182,232 B2 | 5/2012 | Slot | |
| 8,430,633 B2 * | 4/2013 | Carroll | F03D 1/0633 |
| | | | 416/23 |
| 8,568,103 B2 * | 10/2013 | Enevoldsen | F03D 1/0641 |
| | | | 416/223 R |
| 8,602,739 B2 | 12/2013 | Enevoldsen et al. | |
| 8,794,919 B2 * | 8/2014 | Baek | F03D 1/0641 |
| | | | 416/1 |
| 8,814,525 B2 * | 8/2014 | Petsche | F03D 1/0641 |
| | | | 416/223 R |
| 8,944,775 B2 * | 2/2015 | Fuglsang | F03D 1/0641 |
| | | | 416/237 |
| 8,944,776 B2 * | 2/2015 | Lenz | F03D 1/0641 |
| | | | 416/237 |
| 9,151,270 B2 | 10/2015 | Eisenberg et al. | |
| 9,303,621 B2 * | 4/2016 | Fuglsang | F03D 1/0641 |
| 9,377,005 B2 * | 6/2016 | Yarbrough | F03D 1/0641 |
| 9,695,800 B2 * | 7/2017 | Fuglsang | F03D 1/0641 |
| 9,932,960 B2 * | 4/2018 | Petsche | F03D 1/0683 |
| 10,107,258 B2 | 10/2018 | Quiring et al. | |
| 10,151,296 B2 * | 12/2018 | Dent | F03D 1/0641 |
| 10,180,125 B2 * | 1/2019 | Carroll | F03D 1/0675 |
| 2012/0051936 A1 | 3/2012 | Eisenberg | |
| 2012/0134836 A1 | 5/2012 | Carroll et al. | |
| 2012/0141269 A1 | 6/2012 | Giguere et al. | |
| 2012/0189455 A1 | 7/2012 | Enevoldsen et al. | |
| 2015/0132130 A1 | 5/2015 | Brown | |

FOREIGN PATENT DOCUMENTS

| | | |
|---|---|---|
| CN | 103362755 A | 10/2013 |
| EP | 1524431 A1 | 4/2005 |
| EP | 2514961 A1 | 10/2012 |
| WO | 2013060722 A1 | 5/2013 |

OTHER PUBLICATIONS

CN search report from CN Office Action dated Sep. 5, 2018, for corresponding CN patent application No. 201580082808.1.

* cited by examiner

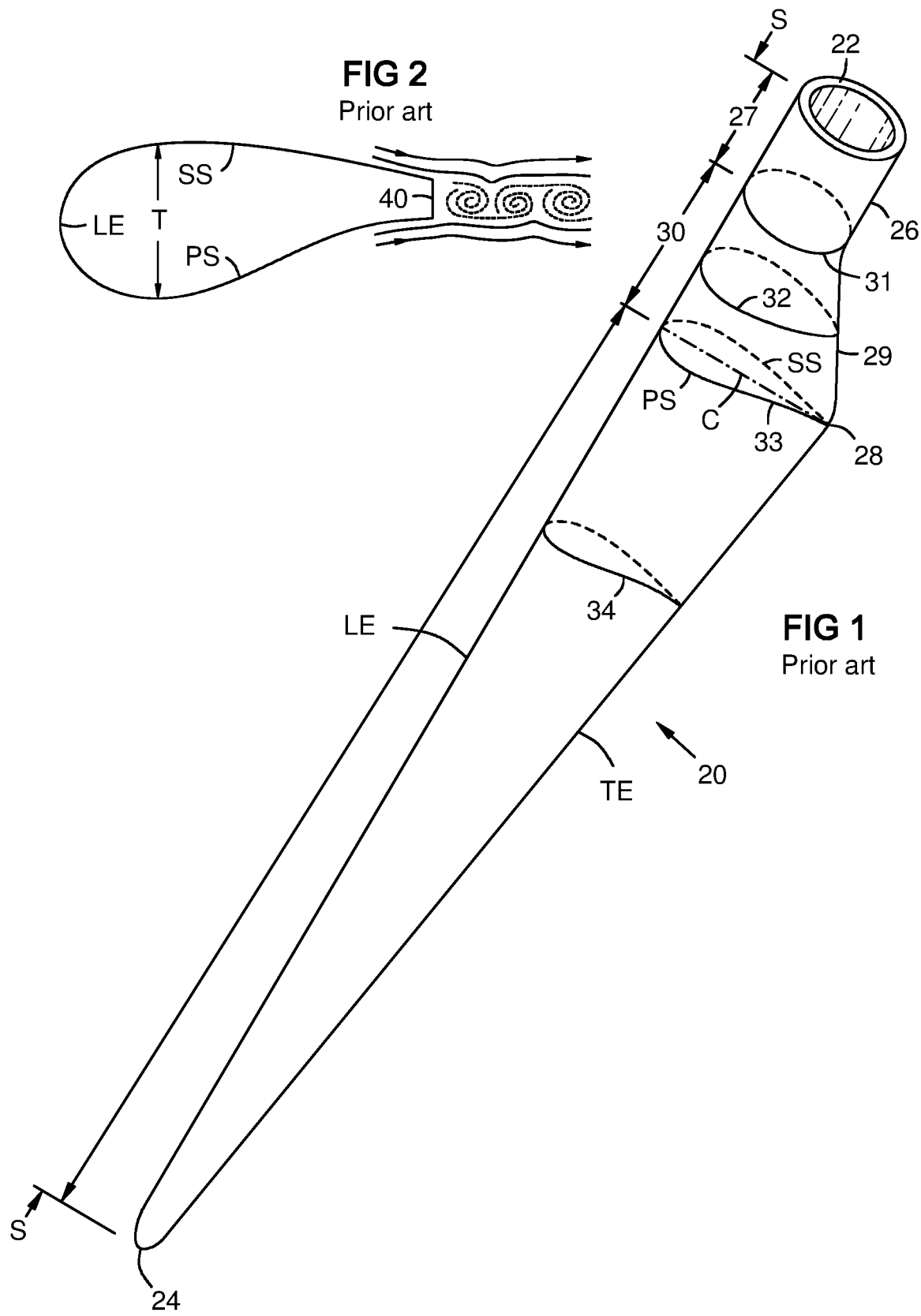

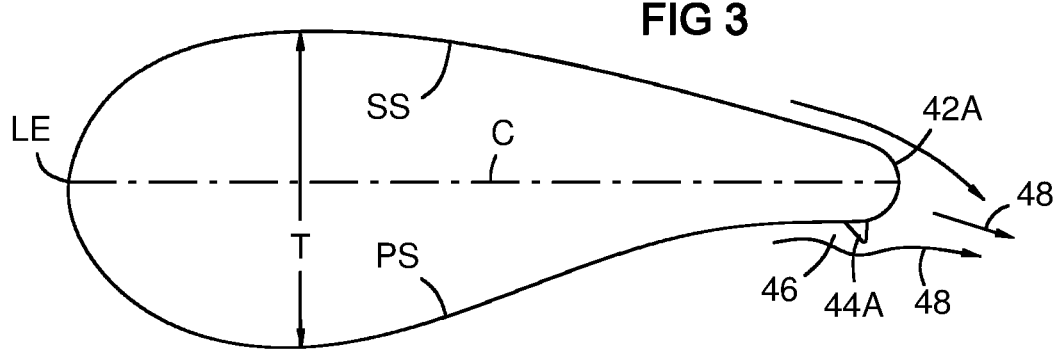
FIG 3
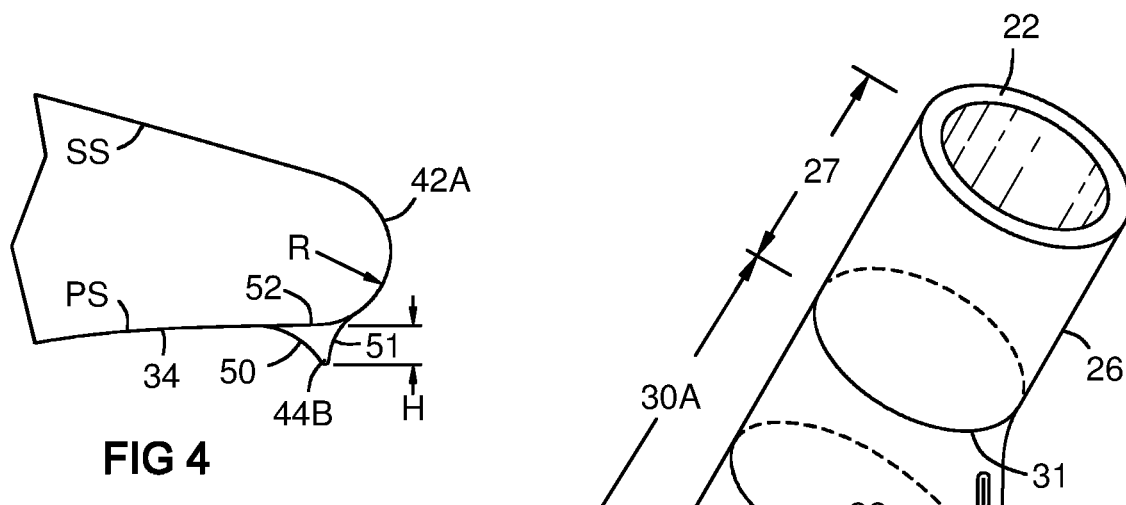
FIG 4
FIG 5

WIND TURBINE BLADE WITH TRAILING EDGE TAB

FIELD OF THE INVENTION

The invention relates to airfoil efficiency, and particularly to a tab extending into the boundary layer on the pressure side of a wind turbine blade near the trailing edge to increase lift.

BACKGROUND OF THE INVENTION

Wind turbine designs have used thick trailing edges with a flat back on an inboard portion of the blades for structural strength and stiffness and increased lift. However, vortex shedding from flat-back trailing edges creates noise and drag. Also the sharp contours of flat-back airfoils cause blade molding problems, thus adding complexity to the blade structural design and blade manufacturing procedures and increasing the risk of non-conformance and repair hours. Vortex shedding has been reduced by devices such as splitter plates that extend aft from the flat-back trailing edge. However, this does not solve the manufacturing problem.

BRIEF DESCRIPTION OF THE DRAWINGS

The invention is explained in the following description in view of the drawings that show:

FIG. 1 illustrates the geometry of a prior wind turbine blade design.

FIG. 2 is a cross sectional profile of a prior flat-back airfoil.

FIG. 3 is a cross sectional profile of a round-back airfoil with a pressure side trailing edge tab.

FIG. 4 shows another tab embodiment.

FIG. 5 is a partial perspective view of an inboard portion of a wind turbine blade showing aspects of an embodiment of the invention.

DETAILED DESCRIPTION OF THE INVENTION

Figure 6:
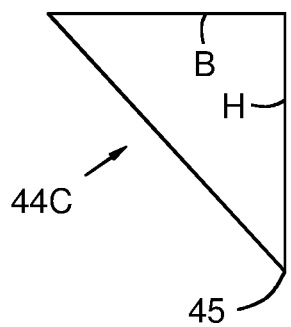
FIG. 6 is a cross sectional profile of a right triangular tab.

FIG. 1 shows the design of a prior wind turbine blade having a leading edge LE, a trailing edge, TE, and a radial span S from a root 22 to a tip 24. It has a cylindrical root region 26 with a radial length 27, a shoulder 28 at the position of maximum length of chord C, and a transition region 29 with a radial length 30 between the cylindrical root portion 26 and the shoulder 28. The transition region transitions in shape between a cylindrical profile 31 at the cylindrical region 26, through an intermediate egg-shaped blunt profile 32, to a lifting profile 33 with a pressure side PS and a suction side SS at the shoulder. "Radially" herein means spanwise S. "Radially inward" or "inboard" means toward or closer to the root 22. "Radially outward" or "outboard" means toward or closer to the tip 24. Outboard of the shoulder 28, the blade tapers to the tip 24. Portions 34 of the pressure side of the blade may be concave.

FIG. 2 shows a profile of a flat-back airfoil with a relatively thick flat trailing edge 40. This design increases blade strength, stiffness, and lift in comparison to an otherwise similar airfoil with a sharp trailing edge and the same chord length C and maximum thickness T. However, it also increases drag and noise by vortex shedding, and is difficult to mold due to the sharp edges of the flat-back.

FIG. 3 shows a profile of a round-back airfoil with a relatively thick rounded trailing edge 42A. It can be thought of as the flatback airfoil of FIG. 1 but with a rounded trailing edge. This provides stiffness without sharp edges, and is thus practical to mold, but it does not increase lift as much as an otherwise similar flat-back airfoil. The inventors found that adding a tab 44A extending from the pressure side PS proximate the trailing edge 42A increases lift and can restore the original performance of the equivalent flatback airfoil. For example, the tab may be located in the aft 10% of the chord C. Airflow 48 slows in front 46 of the tab, increasing pressure and lift. The tab also directs the flow downward, further increasing lift.

FIG. 4 shows another tab embodiment 44B with a concave front surface 50 that helps launch the airflow downward. The back surface 51 of the tab may also be concave or filleted onto the trailing edge, which increases the mounting surface area and structural strength. The tab may be mounted to the blade by adhesive or other means. The curvature of the rounded trailing edge may be generally circular with a radius R that varies with radial position along the blade. For example, the radius may be 50% of chord length at the cylindrical root portion (the chord being a diameter of the cylindrical root portion), tapering to 5-10% of chord length at the shoulder, and further tapering to 2-3% of local chord length at a position 30-50% of the blade span starting from the root 22. If the airfoil has a concave pressure side 34, there is an inflection point 52 where the concave pressure side transitions to the convex trailing edge 42A. In one embodiment, the tab 44B may follow this inflection point along at least a portion of the span of the blade, for example from the shoulder to at least one transition length 30B (FIG. 5) past the shoulder, or from the shoulder to a radial position of 20-30% of the blade span starting from the root 22.

The tab may taper in height H from greatest at an inboard end of the tab to lesser at the outboard end. At the inboard end, increasing lift is more significant and drag is less significant for power production, while at the outboard end frictional and form drag become more significant, due to the local velocity of the blade relative to the air. If the tab has an inboard end at or proximate the inboard end of the transition region 29, the tab height at the inboard end of the tab may be for example 5-12% of chord length, and it may be inversely proportional to radial distance, which means tab height is reduced by half at twice the radial position of the inboard end of the tab. If the tab has an inboard end at or proximate the shoulder 28, the tab height may start for example at 3-6% of local chord length, and it may be inversely proportional to radial distance. Alternately, the tab height may taper in proportion to local chord length. For example, if the tab starts at the shoulder, the tab height may taper from 3-6% of a local chord length at the inboard end of the tab to 0.5%-2% or 0.5%-1% of local chord length at the outboard end of the tab. The tab height may be measured normal to the pressure side to the tip or apex of the tab.

In one embodiment, the height of the tab may be set relative to a local boundary layer, which may be defined for example at reference ambient conditions of 15° C. temperature, 1013 hPa pressure, 1.225 kg/m$^3$ density, and 10 m/s wind speed. Alternately, the reference conditions may be customized for a given site or elevation. Herein "boundary layer" means a layer of airflow contacting the blade surface and extending outward to a distance at which the air flows at 99% of the free-stream wind velocity relative to the blade. The height H of the tab may vary for example from 100% of the boundary layer thickness at the inboard end to 25% of the boundary layer thickness at the outboard end. Combinations of tab height limitations may be used, for example, the inboard end of the tab may have a height of 5-12% of local chord length, while the outboard end may be 25-100% or 50-100% of the local boundary layer.

FIG. 5 is a partial perspective view of an inboard portion 20B of a wind turbine blade illustrating aspects of an embodiment of the invention. The blade may have a root 22, a cylindrical root region 26 with a radial length 27, a shoulder 28 at a radial position of maximum length of chord C, and a transition region 29 with a radial length 30A (transition length) spanning between the cylindrical root portion 26 and the shoulder 28. The transition region may transition in shape between a cylindrical profile 31 at the cylindrical region 26, through an intermediate egg-shaped profile 32, to a lifting profile 33B with a pressure side PS and a suction side SS at the shoulder 28. Portions 34 of the pressure side of the blade may be concave. The blade may have a rounded trailing edge 42A continuing from the egg-shaped profile 32 to a position past the shoulder 28, for example to a position at least one transition length 30B past the shoulder or alternately to at least 30% or 20% of the blade span starting from the root 22. An elongated tab 44B in accordance with an embodiment of the invention may extend from a pressure side of the blade or along at least most of a portion of the trailing edge from the shoulder to one transition length 30B (equal in length to 30A) past the shoulder or to 30% or 20% of the blade span starting from the root 22. The elongated tab may additionally extend over at least most of the transition region 29.

Figure 7:
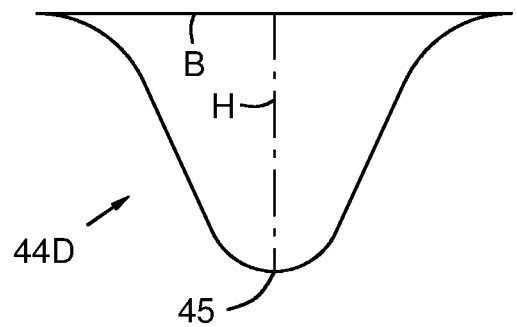
FIG. 7 is a cross sectional profile of rounded isosceles tab.
Figure 8:
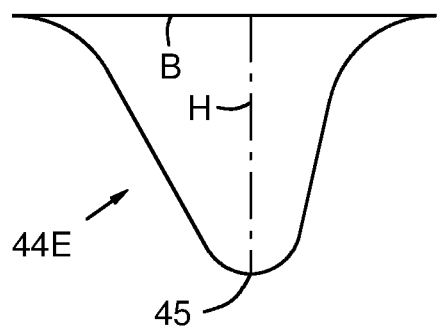
FIG. 8 is a cross sectional profile of rounded asymmetric acute tab.
Figure 9:
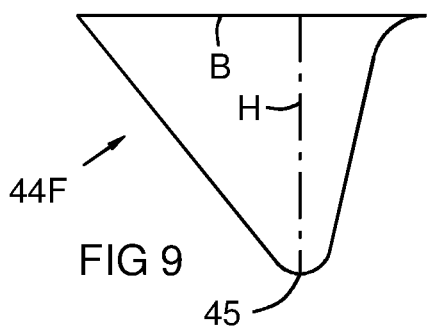
FIG. 9 is a cross sectional profile of a partly rounded asymmetric acute tab.
Figure 10:
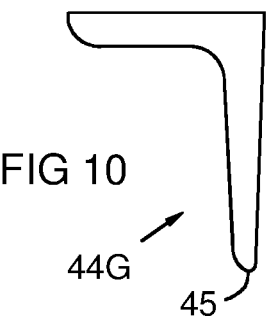
FIG. 10 is a cross sectional profile of an L-shaped tab.
Figure 11:
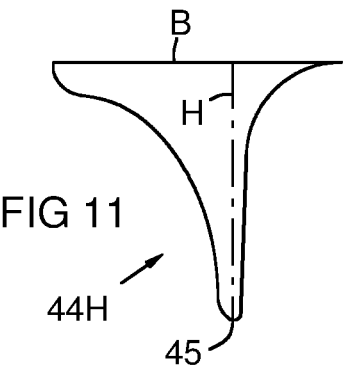
FIG. 11 is a cross sectional profile of an L-shaped tab with fully filleted forward ramp.

FIGS. 6-11 show exemplary cross sectional shapes for tab embodiments with an apex 45, a base 8, and a height H. FIG. 6 is a cross sectional profile of a right triangular tab 44C. FIG. 7 is a cross sectional profile of rounded isosceles tab 44O. FIG. 8 is a cross sectional profile of rounded asymmetric acute tab 44E. FIG. 9 is a cross sectional profile of a partly rounded asymmetric acute tab 44F. FIG. 10 is a cross sectional profile of an L-shaped tab 44G. FIG. 11 is a cross sectional profile of L-shaped tab G with a fully filleted concave forward ramp and filleted base. In all embodiments, the length of 10 the base 8 may be at least 60% of the height H for structural strength and durability of the bond between the base and the pressure side.

Figure 12:
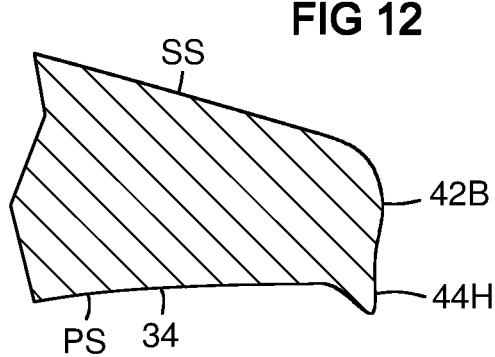
FIG. 12 shows a cross section of a trailing edge with a built-in tab.
Figure 13:
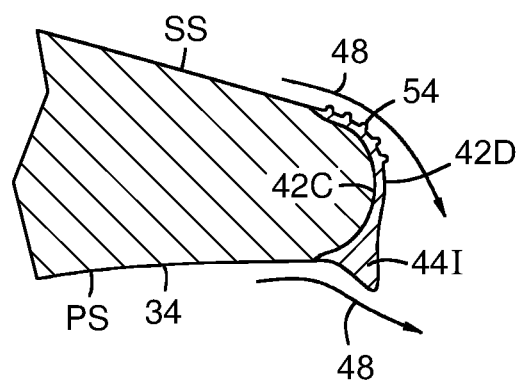
FIG. 13 shows a cross section of a trailing edge with an add-on cover with a tab and turbulators.

FIG. 12 shows a rounded trailing edge 42B that includes a tab 44H formed in the blade mold and integral with the trailing edge 42B. FIG. 13 shows a rounded trailing edge 42C indented as formed to accept an add-on rounded trailing edge cover 42D that includes a tab 44I. It may further include turbulators 54 on the upper half of the trailing edge, such as ridges aligned with the trailing edge. "Upper half" means the half of the trailing edge toward the suction side SS. The turbulators increase turbulence production and this helps the flow stay attached to the rounded trailing edge surface longer than a laminar boundary layer, as known on some Frisbee® toy flying saucers and dimpled golf balls. This reduces pressure drag, and directs the trailing edge flow 48 downward in synergy with the tab 44I, increasing lift. The ridges only need to be 1-5 mm high or they may be higher at the inboard end of the trailing edge 42D to maximize lift, and lower at the outboard end to minimize frictional drag.

Figure 14:
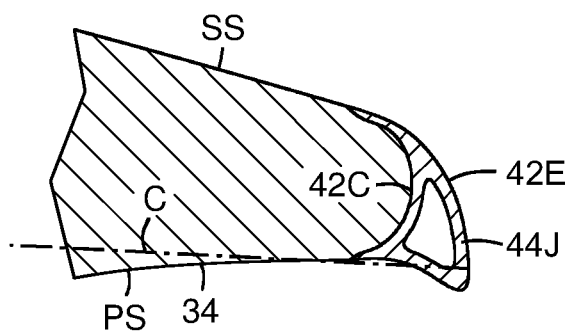
FIG. 14 shows a cross section of a trailing edge with an add-on cover with an extended tab.

FIG. 14 shows a tab 44J extending backward and downward from the molded trailing edge 42C, thus increasing chord length C by up to 20% over the molded chord length. This tab may be attached via an add-on trailing edge cover 42E with a rounded back. It may further include turbulators as in FIG. 13. Different add on covers such as 42D, 42E, and others may be available to adapt a base blade design for different average ambient conditions at different installation sites and elevations.

Figure 15:
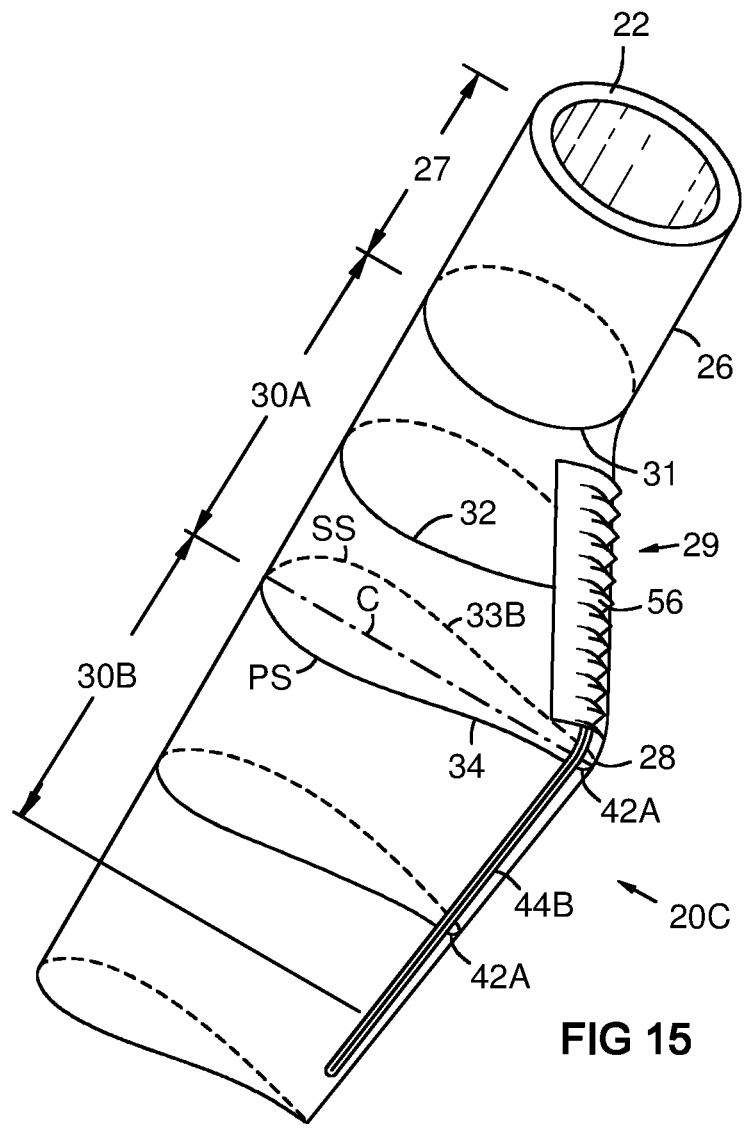
FIG. 15 is a partial perspective view of an inboard portion of a wind turbine blade showing another embodiment of the invention.

FIG. 15 shows an inboard portion of a wind turbine blade 20C with a downward curved corrugated flap 56 on the pressure side proximate the trailing edge over at least most of the length 30A of the transition region 29. The flap 56 may have a greatest height at the inboard end, such as 10% of chord, tapering to 5% at the shoulder 28. A tab 44B in any embodiment previously described may start at the shoulder 28 with a height such as 5% of chord, and taper to a lower height such as 2% of chord at a radial position one transition length 30B outboard of the shoulder. This provides increased lift inboard of the shoulder, and reduced frictional drag outboard of the shoulder.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine blade comprising:
    a cylindrical root portion;
    a maximum chord position comprising a lifting airfoil cross sectional profile;
    a transition region comprising a radial transition length between the root portion and the maximum chord position;
    a trailing edge that is rounded in cross section from the root portion to at least one transition length radially outward of the maximum chord position; and
    an elongated tab extending from a pressure side of the wind turbine blade over at least a portion thereof from the maximum chord position to said one transition length outward of the maximum chord position;
    wherein the tab is located within an aft 10% of the chord length of the blade, and
    wherein the tab comprises a height normal to the pressure side, and the height gradually changes from 3-6% of local chord length at the maximum chord position of the tab to 0.5%-2% of local chord length at an outboard end of the tab.

2. The wind turbine blade of claim 1, wherein the tab further extends along at least a portion of the transition region, wherein the height gradually changes from 5-12% of local chord length at an inboard end of the tab to 0.5%-2% of local chord length at the outboard end of the tab.

3. The wind turbine blade of claim 1, wherein the tab further extends along at least a portion of the transition region, wherein the height is 5-12% of local chord length at an inboard end of the tab, and the tab height is inversely proportional to radial position along the radial span of the tab.

4. The wind turbine blade of claim 1, wherein the tab further extends along a portion of the transition region, wherein the height tapers from 5-12% of local chord length at an inboard end of the tab to 25%-100% of a local boundary layer at the outboard end of the tab.

5. The wind turbine blade of claim 1, wherein pressure side is concave over at least a portion thereof from the maximum chord position to said one transition length outward of the maximum chord position, and the elongated tab extends from and follows a concave/convex inflection point between the concave portion of the pressure side and the rounded trailing edge.

6. The wind turbine blade of claim 1, wherein the tab is generally triangular in cross section and comprises a concave front surface.

7. The wind turbine blade of claim 1, wherein the tab is generally L-shaped in cross section comprising a base portion facing forward and a fully filleted front ramp between the base portion and a height portion thereof.

8. The wind turbine blade of claim 1, wherein the tab is part of an add-on cover bonded to a molded trailing edge of the blade, the cover forming the rounded trailing edge of the blade and the tab, and further comprising turbulators on an upper half of the rounded trailing edge, the upper half being toward a suction side of the blade.

9. The wind turbine blade of claim 8, wherein the turbulators comprises a plurality of ridges parallel to the trailing edge.

10. The wind turbine blade of claim 8, wherein the turbulators decrease in height in proportion to radial position.

11. The wind turbine blade of claim 1, further comprising a downward curved corrugated flap on the pressure side proximate the trailing edge over a portion of the length of the transition region, wherein the corrugated flap comprises a first height at an inboard end thereof and a lesser second height at the maximum chord position, wherein the elongated tab comprises an inboard end at the maximum chord position starting with a third height that is not greater than the second height, and the elongated tab extends radially to the at least one transition length outboard of the shoulder and tapers to a fourth height at the outboard end of the tab that is less than the third height.

12. A wind turbine blade comprising:
a root, a tip, and a span there between;
a cylindrical root portion extending radially outward from the root;
a maximum chord position comprising a lifting airfoil cross sectional profile at a radial position outboard of the cylindrical root portion;
a transition of airfoil profile shape over a spanwise transition length between the cylindrical root portion and the maximum chord position;
a rounded trailing edge with a radius of curvature of at least 2% of a local chord length as seen in cross section over an inboard 30% of the blade span; and
a tab extending from a pressure side of the wind turbine blade within an aft 10% of the local chord length over a portion of the blade from the maximum chord position to at least one transition length outward from the maximum chord position, wherein the radius of curvature is 50% of local chord length at the cylindrical root portion, and reduces to 3-5% of local chord length at one transition length outward from the maximum chord position.

* * * * *